United States Patent [19]

Rankin

[11] 4,301,000
[45] Nov. 17, 1981

[54] METHOD AND APPARATUS FOR FRACTIONATION AND RECOVERY OF LIMESTONE GRITS IN KRAFT PULPING PROCESS

[76] Inventor: John W. Rankin, 2774 Potter St., Eugene, Oreg. 97405

[21] Appl. No.: 58,079

[22] Filed: Jul. 16, 1979

[51] Int. Cl.$^3$ .............................................. B04C 9/00
[52] U.S. Cl. .................................... 209/17; 209/211; 162/30 K
[58] Field of Search .................... 162/30 K, 55, 30 R, 162/35; 209/17, 211, 2; 423/175, 177, 637; 210/304, 297

[56] References Cited

U.S. PATENT DOCUMENTS

| 762,866 | 6/1904 | Allen | 209/211 |
| 762,868 | 6/1904 | Allen | 209/211 |
| 2,725,983 | 12/1955 | Rakowsky | 209/211 |
| 2,879,889 | 3/1959 | Rakowsky | 209/173 |
| 2,917,173 | 12/1959 | Rakowsky | 209/211 X |
| 3,203,761 | 8/1965 | Neuville | 423/117 |

FOREIGN PATENT DOCUMENTS 777561  6/1957  United Kingdom .................. 209/17

Primary Examiner—Ralph J. Hill
Attorney, Agent, or Firm—C. Michael Zimmerman

[57] ABSTRACT

The limestone grits, formerly considered a waste product of the lime slaking process, become economically salvageable after successful fractionation to separate them into three parts: (1) caustic chemicals useful in the kraft pulping process; (2) under-, and over-calcined small limestone particles having an impurity level virtually identical to that of raw limestone; (3) caustic-free large particles containing the majority of residual impurities such as silicon, iron, magnesium, and chromium. The fractionation of limestone grits is economically carried out by a refluxive hydraulic washing system in which the untreated limestone grits from the slaker and first introduced into the open mouth of a vortex washer where they undergo an initial separation in which most of the smaller particles and caustic chemicals are recovered. The larger particles pass from the vortex washer into a second separation stage in the form of a rotating screen drum having fine screens of 20 mesh grade, irrigated by an internal water spray. In this rotating drum, any remaining caustic chemicals and small limestone particles are washed and separated from the large, impure particles by passing through the mesh screening of the drum. The limestone particles and caustic-laden wash water are returned via a pumped line to a liquid inlet in the side of the vortex washer. Passing tangentially into the vortex washer, they constitute a rotating counter-current which achieves the above-mentioned initial separation of the incoming untreated limestone grits. The smaller limestone particles congregate near the top of the vortex washer from which they and the recovered caustic chemicals are pumped to re-enter the kraft pulping process.

21 Claims, 3 Drawing Figures

METHOD AND APPARATUS FOR FRACTIONATION AND RECOVERY OF LIMESTONE GRITS IN KRAFT PULPING PROCESS

BACKGROUND OF THE INVENTION

The kraft pulping process has assumed major importance since its development approximately 100 years ago out of the earlier and simpler alkaline processes. Basically the process relies upon the efficiency of sodium hydroxide combined with sodium sulfide in breaking the intercellular lignin bonds such that wood can be separated into individual fibers. The kraft process and variants of it are useful not only in providing the vast amounts of pulp needed for paper-making, but also in supplying pulp to other users such as the viscose process to produce fiber for synthetic fabrics, and other cellulose-based chemical industries.

The exact nature of the action of sodium hydroxide and sodium sulfide on the lignin bond is not entirely understood, but the kraft process has nevertheless managed to contend very successfully against the principal competitive pulping processes using sulfite chemicals. The success of the kraft process is accountable partly to the broad spectrum of woods which it can successfully convert into pulp. In this regard it is notably superior to the sulfite processes in pulping many hardwoods, and in utilizing scrub wood, trimmings and other low grade pulp sources formerly not thought suitable for paper making.

One of the principal hindrances to the growth of the kraft process in competition with sulfite and other processes has been the necessity to utilize large quantities of expensive alkali chemicals. Long ago, the evaporation and subsequent recombustion of waste pulp processing fluids, or "liquors" was utilized as a way of recovering, re-calcining, and causticizing limestone. Today these recovery processes have been refined and made more efficient and economical by employing more sophisticated and economical lime-sludge recovery means, such as settling and filtration. These measures and many others have significantly aided in reducing cost, minimizing wastage of precious raw materials, and in other ways improving the versatility and efficiency of the kraft process.

Recently, growing public and government concern over the environmental effects of all industrial operations, but particularly those involving the disposal of quantities of chemical waste, has prompted further investigation into recovery processes and systems which might be useful in large volume chemical industries such as the pulp and paper industry. One side effect of these concerns has been that the large-scale disposal of chemical effluents from basic processes has become expensive to the industry concerned, not only because of the loss of potentially useful chemicals but also because environmental standards have made the disposal itself a costly operation.

In terms of sheer volume and expense, the principal raw starting chemical material in the kraft pulping process is limestone (impure calcium carbonate). Since around 250 kilograms of lime for each tone of pulp are needed in the process, it is obvious that the availability of limestone and the cost of processing it and disposing of any waste are extremely significant in a large kraft pulping industry. As already mentioned, pulping mills long ago began to recover lime sludge from their waste processing liquors by evaporation, settling or filtration such that the considerable calcium carbonate content of the lime sludge could be re-calcined to derive calcium oxide, which could then be converted to calcium hydroxide in the slaking operation. While these measures have achieved a great cost and raw material saving and by now must be considered virtually essential, little has yet been done to recover the lime and associated chemicals which are lost in the form of the waste from the slaker, commonly referred to as "limestone grits".

Limestone grits may be considered as whatever portion of the kiln-burned limestone charged into the slaker proves to be unreactive and is rejected as waste. As already noted, the limestone starting material is *mostly* calcium carbonate (approximately 90 percent or more) with the balance being comprised of compounds of silicon, iron, magnesium, chromium and possibly other trace constituents. At the high temperatures involved in the calcining operation, the silicon compounds can actually fuse and coat the limestone particles, rendering them unreactive in the following slaking operation. They will then form one constituent of the limestone grits. Another and more important component of limestone grits are particles of under-calcined or over-calcined limestone. The percentage of these present in limestone grits varies according to the efficiency of operation of the kiln used in the calcining operation.

Under-calcined limestone consists of particles in which at least some portion of the calcium carbonate has not been converted to calcium oxide. Although it is not immediately useful in the kraft pulping process, under-calcium limestone can be recovered in the lime sludge and be successfully re-calcined.

Over-calcined limestone is fully converted to calcium oxide but due to faulty calcining has a dense closely packed molecular structure which does not slake readily. Given sufficient time in contact with water, over-calcined limestone will swell and most of it will then slake.

In addition to the above constituents of limestone grits emerging from the slaker, a considerable quantity of caustic chemicals coats the various particles comprising limestone grits and is thus lost with them in the event they are simply wasted. In the past, limestone grits have not been recovered and reused principally because there seemed to be no economical method of separating the various constituents for reuse.

Without such separation the undesirable constituents in limestone grits are too numerous to permit reuse of the grits in the kraft process cycle. In particular, the silicon is especially harmful since it takes the form of silicon dioxide or silica which results in harmful kiln ring formations. Other harmful ingredients in the grits include high concentrations of metallic ions, in particular iron, which reduce the efficiency of the causticizing. Consequently, any scheme for rendering the limestone grits reusable in the kraft pulping process must either eliminate these harmful constituents or reduce their concentration to a level no greater than the level at which they are present in raw limestone.

This patent application is directed to a process and apparatus for the recovery of limestone grits by fractionation or separation into the discrete components of the grits. As will appear from the remainder of the patent application, by the process and apparatus of this invention these grits are capable of being economically fractionated into more or less usable components, such that any waste is considerably smaller in volume and is free of the caustic chemicals which formerly caused its classification as an environmentally dangerous waste product.

Fundamentally, the process and apparatus of this patent application are designed to take advantage of the discovery by the inventor that separation of the particulate portion of limestone grits into two parts *based on particle size alone* is adequate to recover virtually all of the limestone which has an acceptable impurity level.

Specifically, the particles of approximately 1 mm. size and smaller have an impurity concentration scarcely higher than that of raw limestone. These particles can profitably be returned to the kraft cycle. Recovery of the remaining important constituent in grits, the valuable but environmentally dangerous caustic chemicals, depends only upon establishing reasonable efficiency in washing *all* the particles in the limestone grits. The particles larger than 1 mm. in size can then be rejected, together with virtually all the harmful impurities, from the kraft cycle. Moreover these particles, now freed of their coating of caustic chemicals, can find beneficial uses in other industries.

By applying the above principles in a process and apparatus designed to maximize the efficiency of recovery, the ability of the kraft process to remain economically competitive while minimizing raw resource wastage and environmental hazard is promoted.

DESCRIPTION OF THE PRIOR ART

Prior art approaches to the problems associated with limestone grit recovery have consisted in attempts to utilize conventional screen washing devices in which the grits are mixed with a liquid and passed in contact with a vibratory classifying screen such that only the smaller particles of an acceptable size for reuse pass through the screen and are recovered. These devices have been employed both singly and successively or in cascade in order to improve the quality of separation. Unfortunately, such schemes have so far failed to prove commercially successful partly because of a recurrent problem of screen clogging whenever flow rates of a commercially significant size are attempted. Moreover, the separation efficiency has not been adequate. These problems have rendered the prior art processes infeasible commercially, since the high cost of recovery could not be recouped in terms of the value of recovered material.

SUMMARY OF THE INVENTION

The principal object of the present invention is the provision of a process and apparatus for the fractionation and recovery of limestone grits produced in the course of the kraft pulping process.

A second object of the present invention is to provide a process and apparatus for the fractionation and recovery of limestone grits in which the cost of such recovery is minimized.

A third object of the present invention is to provide a process for the fractionation and recovery of limestone grits in which only a single step of screen washing and classification need be employed, while the separation efficiency is maximized.

A fourth object of the present invention is to provide a process and apparatus for the fractionation and recovery of limestone grits in a refluxive form in which initial separation of the smaller lime particles is achieved in a vortex washer under the influence of a counter-current created by the introduction of liquid effluent from the output of the screen washing-classifier device.

A fifth object of the present invention is to achieve a fractionation of lime grits into two parts, one of which contains reusable caustic chemicals and limestone particles of a purity suitable for reuse in the kraft pulping process, the other of which consists of washed, caustic-free solid particles of limestone and impurities which can be safely and inexpensively disposed of without special precautions, or which can be used as a stable and inert aggregate or land fill or in other useful ways.

A sixth object of the present invention is to provide a process and apparatus for simultaneously rejecting the impurity-containing particles from the kraft process while returning the caustic chemicals and reusable limestone to the kraft process.

A seventh object of the present invention is to provide a process and apparatus which extends the water-contact time of limestone grits beyond that which is permissible in efficient slaker operation in order to permit slaking of over-calcined limestone particles.

An eighth object of the present invention is to provide a process and apparatus in which such over-calcined limestone particles are principally separated by the aforesaid initial separation and returned to the kraft process cycle directly.

A nineth object of the present invention is to provide a process and apparatus for fractionating a mixture to separate and recover wanted constituents from waste constituents.

To the above ends, the process and apparatus for limestone grit fractionation and recovery according to the present invention provides that the mixture of limestone grits rejected from the slaker are transported by means of a conveyor to the upper open end of a vortex washer constituent separator, around the inside wall of which an upwardly spiraling flow of liquid forms a counter-current, causing the useful and wanted constituent of smaller limestone particles to be lifted to a region near the top of the vortex washer while the larger, more impure particles gravitate to the bottom to pass through a conduit into another secondary mixture constituent separator, such as a screen washer in the shape of a rotating, inclined screen drum. The smaller, reusable limestone particles are thus given additional time in contact with water in the vortex washer so that the over-calcined portion of them can continue to slake.

Within the screen drum a further separation of the larger more impure grit particles from any remaining wanted smaller reusable ones is achieved. In particular, the smaller ones pass through the drum made of screening material under the influence of a steady stream of fresh water which washes all the particles free of their coating of caustic chemicals, which is another wanted constituent contained in the limestone grit mixture received from the slaker. As the drum is rotated during the washing process and inclined at an angle to the horizontal, the larger impure grit particles are thoroughly agitated to separate from them any small clinging particles of reusable limestone. These impure, larger particles, now free of caustic chemicals, emerge at the lower end of the drum, falling into a chute from which they are conveyed into a storage area.

The wanted smaller reusable particles which pass through the screen drum together with the wanted water soluble caustic chemicals and wash water are pumped through a conduit back to the vortex washer, which they enter through a port along the side in a direction tangential to the side wall of the vortex washer, forming the counter-current separatory medium flow mentioned before.

These and other features, objects and advantages of the present invention, together with the best mode contemplated by the inventor for carrying out his invention, will become more apparent from reading the following detailed description of a preferred embodiment and perusing the associated drawing in which:

DETAILED DESCRIPTION OF A PREFERRED EMBODIMENT

Figure 1:
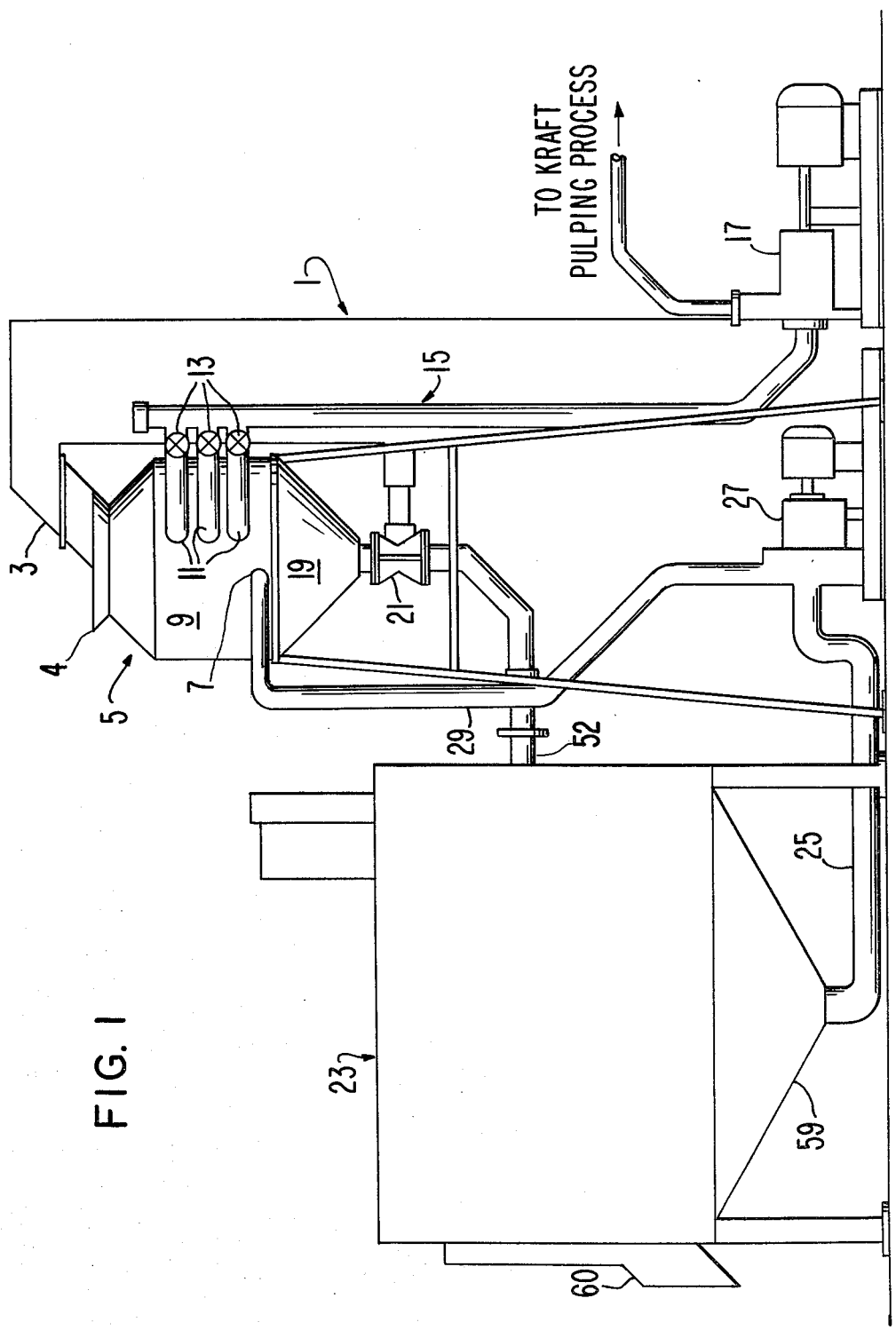
FIG. 1 is a side view of the fractionation apparatus according to the present invention.

In FIG. 1 is shown the fractionation and recovery apparatus of the present invention. A conveyor 1 transports limestone grit mixture, the waste product of the slaking, causticizing operation from the slaker (not shown) upwardly and through a chute 3 to a mixture inlet 4 at the top of a vortex washer 5, in the shape of a hollow cylinder body member, whereby the mixture is introduced into the center of the cavity defined by the hollow cylinder. Within vortex washer 5 the limestone grits, which are in a wet sludge form, undergo an initial separation (to be described in more detail later) under the influence of a stream of washing liquid separatory medium entering vortex washer 5 via a liquid separatory medium inlet 7 positioned near the lower end of the straight cylindrical wall portion 9 of washer 5. Liquid inlet 7 is shaped and positioned so as to produce a substantially horizontal direction of liquid flow, tangentially around the inside of cylindrical wall portion 9 in an upward direction to form, in effect, a sheet of circulating liquid near the inner surface of the wall portion 9, such that the wanted smaller limestone particles within the limestone grits become entrained with the circling washing liquid from inlet 7 and, thereby, separated from the other constituents of the limestone grit mixture introduced at the mixture inlet 4.

Three accept outlet tubes 11 are arrayed vertically along the upper portion of cylindrical wall portion 9 at varying heights therealong. Outlet tubes 11 are positioned along, and open into, wall portion 9 so as to withdraw liquid from the interior of wall portion 9, causing an upward component of liquid motion along the principal axis of the cavity within wall portion 9. Each of the accept outlet tubes 11 may be opened or closed by a corresponding manually operable valve 13, such that any one of tubes 11 or all three of them may be connected for fluid flow into an accept outlet line 15 through which a desired rate of flow may be established by means of a motor-driven output pump 17. As shown in FIG. 1, pump 17 returns the acceptable fraction of the limestone grits together with the water soluble caustic chemical to the kraft pulping process.

By providing three accept outlet tubes 11, each controllable by an independent valve 13, it is possible to carefully monitor and control the initial fractionation which occurs in vortex washer 5 in such a way as to maximize the effectiveness of the fractionation into (1) an "accept" fraction containing only caustic chemicals and reusable limestone particles; and (2) a "reject" fraction containing all large impure particles and as little reusable limestone particles as possible. In this and all other system adjustments, an important criterion is to minimize the amounts of over-calcined limestone in the reject fraction, since these particles exhibit swelling during the early stages of their slaking and would end to clog the mesh screening used in the secondary fractionation to be described below.

The "reject" fraction from washer 5, consisting principally of larger limestone grits, which contain most of the undesirable impurities, gravitates towards the lower end of vortex washer 5 which terminates in an outlet cone 19. From cone 19, the rejected particles pass under the control of an electromagnetically actuated flow control valve 21, which provides proportional control of their flow into a secondary constituent separator, such as screen drum 23.

Details of the structure of screen drum 23 will be covered later in the specification, however at this point it should be noted that drum 23 further washes and classifies the incoming limestone grits, adding a considerable quantity of water to the remaining small acceptable grits. The water and acceptable grits pass through the screen drum 23, emerge through a drum accept line 25 and are pumped at high speed by a vortex washer pump 27 through a vortex inlet line 29 to form the separatory medium, which is introduced into vortex washer 5 through liquid inlet 7, thus completing the refluxive washing cycle.

Figure 2:
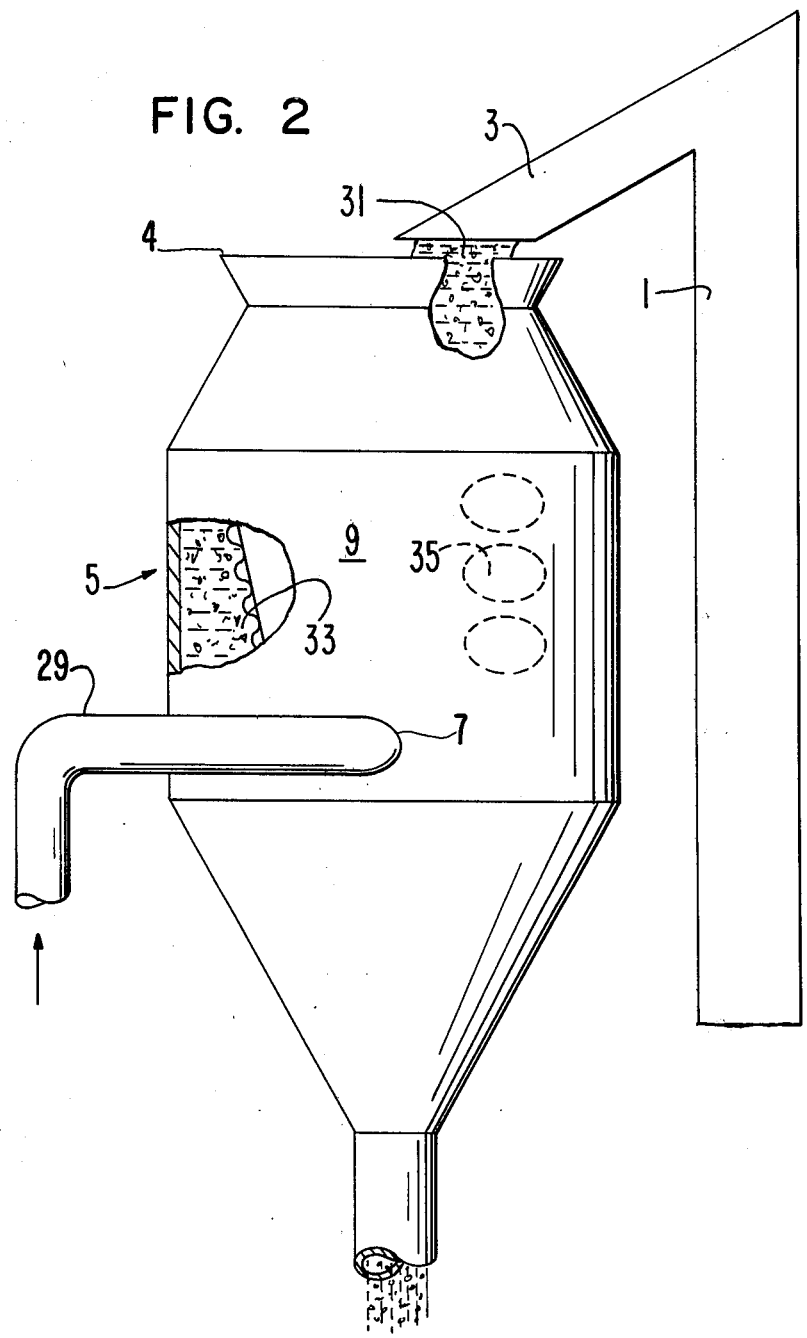
FIG. 2 shows a vortex washer according to the present invention, partially cut away to reveal significant internal details.

Turning now to FIG. 2, the novel features of the vortex washing action are more clearly illustrated. In FIG. 2 a slurry of limestone grits 31 emerges from conveyor 1 through chute 3 and enters vortex washer 5, through the mixture inlet 4. Within vortex washer 5, the slurry 31 encounters a rapidly upwardly circulating stream of liquid 33 tangentially moving along the inner surface of cylindrical wall portion 9. However, as a result of a continuous flow of this liquid stream out of washer 5 by means of an accept outlet 35 (shown in dotted outline) connected to one of accept outlet tubes 11, the motion of the washing liquid within washer 5 has a slow upward velocity component.

Consequently, the smaller and more desirable limestone particles within limestone grits 31 will be entrained and be buoyed upwardly by this stream permitting larger particles of unacceptable and impure limestone grit to gravitate toward the center and downwardly such that they emerge from washer 5 to pass to the following screen drum 23. Although this initial fractionation of the limestone grits in slurry 31 is by no means complete, it does achieve an initial classification and separation which greatly lightens the burden of the screen drum 23 which follows in the cycle. In particular, the troublesome swelling of over-calcined lime particles is dealt with by the separatory medium and removal of the majority of these particles before they can lodge in the mesh of the screen drum.

Moreover the refluxive nature of the cycle in which the highly classified and fractionated fluid from drum accept line 25 is actually used as the washing fluid in vortex washer 5 results in a considerable enhancement of the cost-effectiveness of the apparatus. In particular, it is to be noted that:

(1) the finally unacceptable, large impure limestone grits are twice washed to remove any coating of valuable caustic chemicals. The first washing occurs in vortex washer 5 in the stream of washing liquid which enters washer 5 from drum accept line 25. Thus, the chemical content of the liquid in drum accept line 25 is further enhanced by its use to wash incoming raw limestone grits in slurry 31. A second washing of the unacceptable limestone grits occurs in screen drum 23 such that virtually all remaining caustic chemicals are recovered and prevented from being an environmental waste hazard by the final washing in pure water which occurs in screen drum 23.

(2) An additional reason why the refluxive nature of the fractionating apparatus according to the present invention is beneficial is because it lightens the load on screen drum 23 so much that only a single screening apparatus (drum 23) need be used in the process. This results in significant savings as compared to prior art limestone grit recovery schemes utilizing several screen classifiers operated in cascade.

Figure 3:
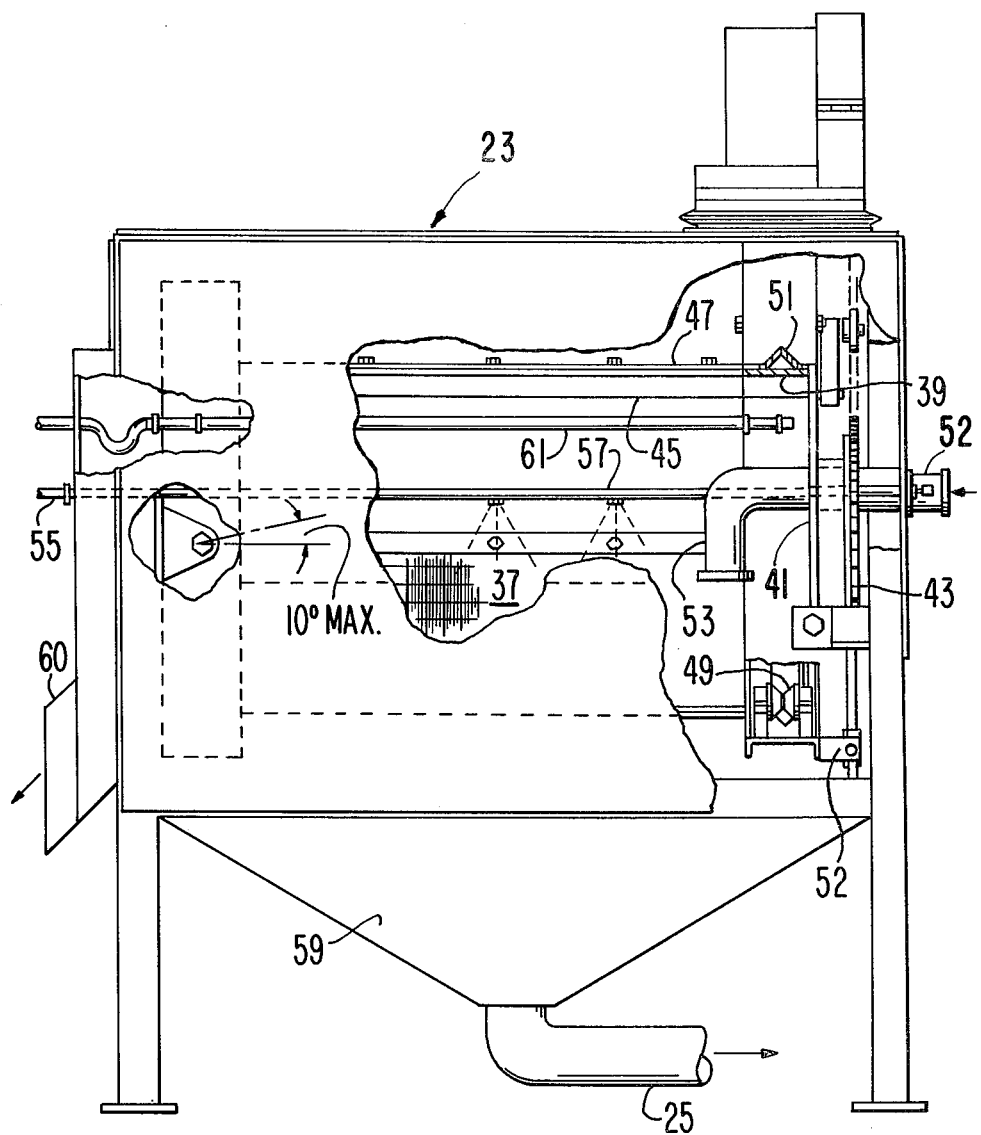
FIG. 3 shows a screen washer according to the present invention, partially cut away to reveal significant internal details.

In FIG. 3 details of the internal structure and functioning of screen drum 23 are shown. A cylindrical screen 37, which may consist of 20 mesh stainless steel screening, for example, forms the central classifying element in screen drum 23. Screen 37 is supported and given shape by a pair of hoop members 39 with circular end plates 41, to one of which is attached as by welding a chain drive sprocket 43. An electric drive motor and chain and drive sprocket (not shown) complete the power train for rotating cylindrical screen 37 about its longitudinal axis.

As shown in FIG. 3 the longitudinal axis of screen 37 is tilted so as to form an angle with the horizontal of as much as 10 degrees. A plurality of internal vanes 45 extend longitudinally along the inside surface of cylindrical screen 37 in order to aid in agitating and washing the contents of screen drum 23. The structure of cylindrical screen 37 is further reinforced by a plurality of longitudinal cap strips 47 which clamp the fine and somewhat delicate mesh screening to the outer surfaces of vanes 45. The structure of cylindrical screen 37 is supported in a manner permitting rotation by a plurality of V-shaped rollers 49 which engage a correspondingly V-shaped bearing surface 51 on hoop members 39.

In order to permit optimization of the angle of inclination of the axis of screen 37, V-shaped rollers 49 are desirably mounted on adjustable supports 52. For similar reasons conventional means of changing the electric motor drive ratio for varying the speed or any other know suitable means for varying the rotational speed of cylindrical screen 37 may be employed.

As shown the rejected grits from vortex washer 5 are routed into the housing of screen drum 23 through a charge inlet 52 where they emerge from an inlet nozzle 53 which deposits the rejected limestone grits from vortex washer 5 at the slightly elevated input end of cylindrical screen 37. A fresh water spray line 55 connects a source of fresh water at approximately 80 psi (not showwn) to two internal spray bars 57, from which the water emerges to irrigate the tumbling limestone grit charge from nozzle 53 as screen 37 is rotated. The consequent spraying, tumbling action aided by internal vanes 45 rapidly washes soluble caustic chemicals and small particles of limestone from the large impure grits and through cylindrical screen 37 to a collector funnel 59 which connects to drum accept line 25. Thereafter, as noted earlier in this specification, the mixture of small reusable limestone particles, dissolved caustic chemicals and wash water is rapidly pumped to liquid separtory medium inlet 7 on voetex washer 5 to form the separatory medium flow within the cavity of the washer.

The larger limestone grit particles which contain most of the impurities, having first been washed in their passage through vortex washer 5 are once again washed in pure water to remove any traces of caustic chemicals and after tumbling many times around the circumference of cylindrical screen 37, gradually emerge from the outlet end of screen drum 23 and pass through a chute 60 for disposal in an ordinary dump, use as aggregate in concrete or as land fill or even for use in agricultural lime products.

Although the initial separation of smaller limestone particles achieved by vortex washer 5, in combination with the large surface area of cylindrical screen 37 and the tumbling, washing action cooperate to minimize the screen clogging which formerly plagued the all-screen separators used for limestone grit recovery, an additional means of avoding such clogging is incorporated in screen drum 23 according to the present invention. A knock-off spray bar 61 is positioned adjacent the outer perimeter of cylindrical screen 37 to aid in removing any limestone particles which cling to the mesh of cylindrical screen 37. Knock-off spray bar 61 is supplied with a source of high pressure liquid which may be "weak wash," a mild liquor derived from the kraft pulping process itself, or spray bar 61 may even be supplied with washing fluid from the vortex inlet line 29 (FIG. 1) by means of a T-connection (not shown).

Typical dimensions of the major parts of the fractionation and recovery system according to the present invention are as follows:

| Items | Dimensions |
| --- | --- |
| outside diameter of vortex washer 5 | 36" |
| vertical height of straight cylindrical wall portion 9 | 24" |
| outside diameter of cylindrical screen 37 | 36" |
| length of cylindrical screen 37 | 72" |

Although not shown, the fractionation and recovery system according to the present invention may be provided with any conventional system of electromagnetic control arranged at a convenient nearby control panel to provide a semi-automatic installation. Moreover the system may be provided with additional sensors and controls including the most advanced microprocessor circuitry for full automation.

Although the invention has been described with some particularity in reference to a single set of embodiments which taken together comprise the best mode contemplated by the inventor for carrying out his invention, it will be apparent to those skilled in the art that many modifications could be made and many apparently different embodiments thus derived without exceeding the scope of the invention. Therefore, the scope of the invention is to be interpreted only from the following claims.

I claim:

1. A refluxive washing apparatus for the fractionation of a wet sludge mixture of particles of varying sizes and liquid soluble chemicals for the purpose of rejecting from said mixture all said particles larger than a certain preselected size, comprising:

a vortex washer having, a hollow body member into which said wet sludge mixture is introduced, said body member including a substantially cylindrical wall portion oriented with its major axis generally vertical;

a liquid inlet conduit intersecting said cylindrical wall portion in a direction selected to inject a flow of liquid from said liquid inlet generally tangentially of said cylindrical wall portion to produce a sheet of liquid rotating around the interior of said cylindrical wall portion;

an accept outlet tube intersecting said cylindrical wall portion generally above said liquid inlet tube; and a reject outlet located generally below said liquid inlet conduit and positioned generally axially of said cylindrical wall portion; and a screen washer having an inlet connected in fluid flow communication with said reject outlet to receive the flow of rejected matter from said vortex washer, said screen washer having a mesh screening of a mesh size selected to pass only those of said particles smaller than said preselected size;

a liquid inlet for communicating with an external source of washing liquid;

a sprayer positioned to direct a spray of said washing liquid generally in a direction to wash said smaller particles through said mesh screening;

a screen washer accept line positioned and arranged to receive all liquid and particles passing through said mesh screening, said screen wash accept line being connected in fluid flow communication with said liquid inlet conduit of said vortex washer by means of a vortex washer pump, whereby said particles and liquid passed by said mesh screening are used as a source of liquid in said vortex washer.

2. The refluxive washing apparatus of claim 1 wherein said vortex washer is provided with a substantially conical wall portion joined at its wider end substantially coaxial to one end of said cylindrical wall portion and defining at its narrower end said reject outlet.

3. The refluxive washing apparatus of claim 2 wherein said vortex washer reject outlet is communicated in fluid flow with said screen washer inlet by means of a proportional flow control valve.

4. The refluxive washing apparatus of claim 2 wherein said screen washer comprises a screen drum, said screen drum being a cylinder of mesh screening material into one end of which said screen washer inlet extends to thereby deposit said rejected matter from said vortex washer therewithin; means to rotate said screen drum about its major axis, and means to selectively elevate said one end of said drum to cause reject particles larger than the mesh of said screen to traverse the length of said screen drum and fall out the other end of said drum.

5. The refluxive washing apparatus of claim 1 wherein said cylindrical wall portion is a portion of a circular cylinder.

6. The refluxive washing apparatus of claim 1 further including a plurality of accept outlet tubes arrayed along said cylindrical wall portion mutually spaced apart vertically from each other and from said liquid inlet conduit.

7. A method for the fractionation and recovery of particulate matter from a wet sludge, said particulate matter including particles of widely different sizes, comprising the steps:

(a) providing a vortex washer having a hollow body generally vertically oriented, around a portion of the inside wall of which a sheet of liquid tangentially rotates;

(b) introducing said sludge into said vortex washer into contact with said sheet of liquid;

(c) withdrawing said liquid and the smaller of said particles at an accept outlet near the top of said vortex washer and withdrawing the larger of said particles at a reject outlet near the bottom of said vortex washer;

(d) providing a screen washer having an inlet line, an accept outlet line, a mesh screen interposed in the path of fluid flow from said inlet line to said outlet line, and a washing liquid inlet means to spray a washing fluid in said path of fluid flow on the inlet side of said mesh screen;

(e) providing a pump for pumping the contents of said accept outlet from said screen washer back to said vortex washer to supply liquid for said sheet of rotating liquid.

8. A method of refluxively washing and fractionating a sludge of particulate matter and soluble chemicals, comprising the steps:

(a) providing a screen washer having:
an input aperture for introducing mixtures to be separated;
a mesh separation screen;
a washing liquid inlet for irrigating said mesh separation screen;
an accept outlet line for extracting from said screen washer a mixture of particles passing through said mesh screen, said washing liquid and soluble chemicals;

(b) providing a vortex washer having:
a hollow cylindrical body oriented generally vertically, a washing liquid inlet positioned on said body to direct a stream of washing liquid tangentially around the inside of said body;
an accept outlet line positioned on said body above said washing liquid inlet;
a reject outlet at the lower end of said body;

(c) connecting said reject outlet of said vortex washer in fluid flow communication with said screen washer input aperture;

(d) providing a pump interconnected between said screen washer accept outlet and said vortex washing liquid inlet;

(e) providing an external source of washing liquid connected to said screen washer liquid inlet; and (f) introducing said sludge into said vortex washer.

9. Apparatus for fractionating a mixture of constituents, comprising:

a vortex constituent separator having a body member defining a cavity extending along a principal axis, a mixture inlet intersecting said body member for introducing said mixture into said cavity, a separatory medium inlet intersecting said body member for introducing a separatory medium flow that circulates in said cavity about and travels in a direction along said principal axis and fractionates said mixture, a plurality of first outlets intersecting said body member to be in flow communication with said separatory medium flow in said cavity, said plurality of first outlets is arrayed along the body member mutually spaced apart in the direction of said separatory medium flow along said principal axis of said cavity for receiving and discharging different first fractions of said mixture, and a second outlet intersecting said body member at a position for receiving and discharging a second fraction of said mixture from said cavity; and a secondary constituent separator for fractionating mixtures having a charge inlet and a fraction accept outlet, said charge inlet coupled to an outlet of said vortex constituent separator for receiving the fraction discharged therefrom, and said fraction accept outlet coupled to receive and discharge a selected fraction of said fraction received from said outlet of said vortex constituent separator, said fraction accept outlet coupled to the separatory medium inlet of said vortex constituent separator for delivering said selected fraction to said separatory medium inlet and forming the separatory medium.

10. The apparatus of claim 9 wherein the mixture includes waste and a plurality of wanted constituents, the plurality of first outlets is arrayed along the body member of the vortex constituent separator to receive and discharge separately a plurality of first fractions, the second outlet intersects said body member to receive and discharge principally the waste constituent as the second fraction, the charge inlet of the secondary constituent separator is coupled to said second outlet to receive said second fraction, said secondary constituent separator fractionates said second fraction to separate wanted constituents and waste constituents, and the fraction accept outlet of said secondary constituent separator receives said separated wanted constituents and discharges them to the separatory medium inlet as the selected fraction.

11. The apparatus of claim 10 wherein the mixture is a wet sludge of particles and liquid soluble chemicals, the wanted constituents of the plurality of first fractions include particles of a size smaller than a selected size and said liquid soluble chemicals, the waste constituents of the second fraction include particles of a size larger than said selected size, the secondary constituent separator includes a liquid washer and a particle size separator, said liquid washer is in fluid flow communication with the second fraction received from the vortex constituent separator for subjecting said second fraction to a wash by a liquid that removes said liquid soluble chemicals from particles included in said second fraction, said particle size separator separates particles of a size smaller than said selected size from the other particles included in said second fraction, and the fraction accept outlet of said secondary constituent separator receives said separated liquid soluble chemicals and particles of a size smaller than said selected size and discharges them to the separating medium inlet of said vortex constituent separator as the selected fraction.

12. The apparatus of claim 11 wherein the cavity of the vortex constituent separator is oriented with the principal axis vertical, the separatory medium inlet intersects the body member of the vortex constituent separator at a location between opposite ends of said body member for introducing the separatory medium into said cavity in a manner productive of a separatory medium flow that travels vertically along said principal axis and entrains the first fraction, the plurality of first outlets of said vortex constituent separator intersect said body member above said separatory medium inlet, the mixture inlet of said vortex separator is above said plurality of first outlets, and the second outlet of said vortex constituent separator intersects said body member below said separatory inlet.

13. The apparatus of claim 12 further including a valve means operatively associated with each of the first outlets of the vortex constituent separator for controlling the discharge flow through said each first outlet.

14. The apparatus of claim 12 wherein the secondary constituent separator is a screen washer having a mesh screening and a liquid sprayer, said mesh screening of a mesh size selected to pass only those particles of a size smaller than the selected size, said mesh screening interposed in the flow of the second fraction from the charge inlet to the fraction accept outlet, and said liquid sprayer is positioned to direct a spray of the liquid generally in a direction to wash said second fraction and cause the smaller particles to pass through said mesh screening.

15. A method of fractionating particulate matter in a wet mixture, said particulate matter including particles of various sizes, comprising the steps:

directing a separatory medium flow along a path that circulates about and travels along a selected line;

introducing said wet mixture into contact with the separatory medium flow so that particles of a size smaller than a selected size are entrained by said separatory medium flow;

withdrawing along said path the particles entrained by said separatory medium flow;

withdrawing particles not entrained by said separatory medium flow;

separating particles of a size smaller than said selected size from the withdrawn particles not entrained by said separatory medium flow; and forming the separatory medium from said separated particles.

16. The method of claim 15 wherein the wet mixture includes chemicals, the wet mixture is introduced into contact with the separatory medium flow so that the smaller particles and chemicals are entrained, the entrained smaller particles and chemicals are withdrawn along the path of the separatory medium flow, the particles and chemicals not entrained by said separatory medium flow are withdrawn, and the separatory medium is formed from the separated particles and chemicals not entrained by said separatory medium, further comprising the step of washing the withdrawn particles not entrained by said separatory medium flow to remove chemicals therefrom for subsequent forming of said separatory medium.

17. Apparatus for fractionating a mixture containing particles of various sizes, comprising:

a vortex constituent separator having a body member defining a cavity extending along a principal axis, a mixture inlet intersecting said body member for introducing said mixture into said cavity, a separatory medium inlet intersecting said body member for introducing a separatory medium into said cavity in a manner productive of a separatory medium flow that circulates in said cavity about and travels in a direction along said principal axis and fractionates said mixture, a first outlet intersecting said body member to be flow communication with said separatory medium flow in said cavity at a position spaced from said separatory medium inlet in the direction of said separatory medium flow along said principal axis for receiving and discharging a first fraction of said mixture comprised of particles principally of a size smaller than a selected size, and a second outlet intersecting said body member at a position for receiving and discharging from said cavity a second fraction of said mixture comprised of particles principally of a size larger than said selected size; and a secondary constituent separator for fractionating mixtures having a charge inlet and a fraction accept outlet, said charge inlet coupled to the second outlet of said vortex constituent separator for receiving the second fraction discharged therefrom, said secondary constituent separator fractionating said second fraction to separate therefrom particles principally of a size smaller than said selected size and form a selected fraction, and said fraction accept outlet coupled to receive and discharge the selected fraction, said fraction accept outlet coupled to the separatory medium inlet of said vortex constituent separator for delivering said selected fraction to said separatory medium inlet and forming the separatory medium.

18. The apparatus of claim 17 wherein the cavity of the vortex constituent separator is oriented with the principal axis vertical, the separatory medium inlet intersects the body member of the vortex constituent separator at a location between opposite ends of said body member for introducing the separatory medium into said cavity in a manner productive of a separatory medium flow that travels vertically along said principal axis and entrains the first fraction, the first outlet of said vortex constituent separator intersects said body member above said separatory medium inlet, the mixture inlet of said vortex separator is above said first outlet, and the second outlet of said vortex constituent separator intersects said body member below said separatory medium inlet.

19. The apparatus of claim 18 wherein the mixture is a sludge of wet particulate matter of various particle sizes, the selected fraction discharged by the second constituent separator includes particles entrained in a liquid to form the separatory medium.

20. Apparatus for fractionating a wet sludge mixture of particles and liquid soluble chemicals, comprising:

a vortex constituent separator having a body member defining a cavity extending along a principal axis, a mixture inlet intersecting said body member for introducing said mixture into said cavity, a separatory medium inlet intersecting said body member for introducing a separatory medium into said cavity in a manner productive of a separatory medium flow that circulates in said cavity about and travels in a direction along said principal axis and fractionates said mixture, a first outlet intersecting said body member to be in flow communication with said separatory medium flow in said cavity at a position spaced from said separatory medium inlet in the direction of said separatory medium flow along said principal axis for receiving and discharging a first fraction of said mixture including particles within a selected size range and said liquid soluble chemicals, and a second outlet intersecting said body member at a position for receiving and discharging from said cavity a second fraction of said mixture including particles of a size outside said selected size range; and a secondary constituent separator including a liquid washer and particle size separator for fractionating mixtures, said secondary constituent separator having a charge outlet and a fraction accept outlet, said charge inlet is coupled to the second outlet of said vortex constituent separator for receiving the second fraction discharge therefrom, said fraction accept outlet is located for receiving and discharging a selected fraction of said second fraction, said liquid washer is in fluid flow communication with the second fraction received at said charge inlet for subjecting said second fraction to a wash by a liquid that removes said liquid soluble chemicals from particles included in said second fraction, said particle size separator separates particles of a size within said selected size range from other particles included in said second fraction, and said fraction accept outlet is coupled to receive said separated liquid soluble chemicals and separated particles of a size within the selected size range and discharge them to the separatory medium inlet of the vortex constituent separator as the selected fraction.

21. The apparatus of claim 20 wherein the particles included in the first fraction are particles of a size smaller than a selected size and the particles included in the second fraction are particles of a size larger than said selected size, the secondary constituent separator is a screen washer having a mesh screening and a liquid sprayer, said mesh screening of a mesh size selected to pass only those particles of a size smaller than the selected size, said mesh screening interposed in the flow of the second fraction from the charge inlet to the fraction accept outlet, and said liquid sprayer is positioned to direct a spray of the liquid generally in a direction to wash said second fraction and cause the smaller particles to pass through said mesh screening.

* * * * *